United States Patent [19]

Morie et al.

[11] 4,145,518
[45] Mar. 20, 1979

[54] FIBERS, FILTER RODS AND OTHER NONWOVEN ARTICLES MADE FROM POLY(1,2-PROPYLENE TEREPHTHALATE)COPOLYESTERS OF TEREPHTHALIC ACID, 1,2-PROPYLENE GLYCOL AND ETHYLENE GLYCOL

[75] Inventors: Gerald P. Morie; Cephas H. Sloan; Winston J. Jackson, Jr.; Herbert F. Kuhfuss, all of Kingsport, Tenn.

[73] Assignee: Eastman Kodak Company, Rochester, N.Y.

[21] Appl. No.: 748,037

[22] Filed: Dec. 6, 1976

[51] Int. Cl.² ............................................. C08G 63/18
[52] U.S. Cl. .................................... 528/272; 8/130.1; 131/267
[58] Field of Search ..................... 260/75 R; 528/272

[56] References Cited

U.S. PATENT DOCUMENTS

| | | | |
|---|---|---|---|
| 2,744,089 | 5/1956 | Caldwell | 260/75 R |
| 3,321,437 | 5/1967 | Goodman et al. | 260/75 R X |
| 3,574,789 | 4/1971 | Bungs et al. | 260/75 R X |
| 3,686,361 | 8/1972 | Dewitt et al. | 260/75 R X |
| 3,814,725 | 6/1974 | Zimmerman et al. | 260/75 R X |

Primary Examiner—Lucille M. Phynes
Attorney, Agent, or Firm—J. Frederick Thomsen; D. B. Reece, III

[57] ABSTRACT

This invention concerns fibers of amorphous polyesters of terephthalic acid or an ester forming derivative thereof and from about 60 mole percent to 100 mole percent 1,2-propylene glycol and from 0 to about 40 mole percent ethylene glycol. These fibers are useful for the production of bonded coherent cigarette filters, nonwoven fabrics and the like.

5 Claims, No Drawings

FIBERS, FILTER RODS AND OTHER NONWOVEN ARTICLES MADE FROM POLY(1,2-PROPYLENE TEREPHTHALATE)COPOLYESTERS OF TEREPHTHALIC ACID, 1,2-PROPYLENE GLYCOL AND ETHYLENE GLYCOL

This invention relates to fibers made from amorphous polyesters of terephthalic acid or ester forming derivatives thereof, 1,2-propylene glycol and optionally modified with up to 40 mole percent of ethylene glycol. These polyester fibers are bondable into coherent cigarette filters when treated with high-boiling plasticizers. Additionally, these polyester fibers when bonded by high-boiling solvents are also useful in nonwoven fabrics such as diaper liners and the like.

Numerous patents and articles have been published disclosing the lack of utility of polyesters derived from terephthalic acid and 1,2-propanediol. These polyesters are described as being not formable into useful fibers due to their "inherently" poor physical properties. U.S. Pat. No. 3,574,789 discloses the addition of small amounts of poly(propylene terephthalate) having a low molecular weight to polyvinyl chloride to improve the processing properties of the resin. U.S. Pat. No. 3,814,725 broadly describes the addition of reinforcing fillers such as chopped glass, asbestos fibers, cellulose fibers and the like, to poly(1,3-propylene terephthalate) to improve physical properties. Japanese Pat. No. 47941/73 reflects the state of the art regarding poly(1,2-propylene terephthalate) as it states:

"Propylene terephthalate resin, on the other hand, is markedly different from polyethylene terephthalate resin, even though the molecular structure would suggest that they can be treated similarly. Since propylene terephthalate resin is noncrystalline, it is not used to prepare fibers and films, let alone injection-molded products. Thus, it has not been considered possible to mix it with glass fibers to improve its properties."

U.S. Pat. No. 3,321,437, Col. 1, discloses "Polyesters obtained, for example, by using 1:2-propylene glycol . . . melt at 122° . . . and are of *no value for fibers*" (Emphasis added.)

Other patents and articles disclosing the art recognized lack of utility of manufactured articles especially fibers of polyesters of terephthalic acid and 1,2-propanediol are as follows:

U.S. Pat. No. 2,744,089 — Col. 6
U.S. Pat. No. 2,901,501 — Col. 5
U.S. Pat. No. 3,047,536 — Col. 4
Carpenter, J. Soc. Dyers Colorists 65, 478 (1949)
Hill & Walker, J. Polymer Sci., 3, 609 (1948)

Surprisingly, we have discovered that new types of tobacco smoke filters and other solvent-bonded articles can be prepared using existing technology and fibers made of terephthalic acid, 1,2-propanediol and from 0 to 40% of ethylene glycol as more specifically defined hereinafter. These novel fibers exhibit most advantageous properties in that (1) they are rapidly bondable with surprisingly small amounts of common plasticizers commonly used in the preparation of bonded cigarette filter rods, (2) they allow the preparation of filter tow with highly acceptable taste characteristics, (3) they exhibit low shrinkage at high temperatures encountered during cigarette smoking, (4) they are plasticizer bondable into rigid coherent structures, (5) they may be comingled with other crystalline polymeric materials and still maintain highly advantageous filter capabilities, (6) may be drawn into very fine deniers which allow better filtration than commonly used filter material such as cellulose acetate fibers, (7) are more rapidly plasticizer bonded than conventional filter tow and (8) are easily made into nonwoven articles such as diaper liners which also exhibit highly advantageous physical properties.

Accordingly, there is provided a fiber of a polyester of terephthalic acid or an ester forming derivative thereof and a glycol of from about 60 mole percent to 100 mole percent of which is 1,2-propylene glycol and from 0 to about 40 mole percent is ethylene glycol; said polyester having an inherent viscosity of at least about 0.35 in a 60/40 parts by weight solution of phenol/tetrachloroethane at 25° C. at a concentration of 0.5 gram of polyester in 100 ml. of said solvent and a Tg of at least 80° C.

The polymers from which the novel fibers of this invention are prepared have essentially no crystallinity and a glass transition temperature of at least 80° C. and preferably at least about 85° C. These fibers can be bonded with various high boiling organic esters commonly associated with production of acetate filter rods. Examples of these plasticizers are the Estrobond ® Plasticizers sold by the Eastman Kodak Company. Plasticizers as well as their composition are more fully disclosed in the Eastman Kodak Company Technical Bulletin No. 2–70 entitled "Estron ® Acetate Tow for Cigarette Filters on Plasticizers", incorporated herein by reference. These plasticizers are utilized either individually or blends of these plasticizers may be modified with polyalkylene glycols such as polyethylene glycol having a molecular weight in a range of from about 300 to about 700. Additionally, some of these plasticizers may be blended with up to about 10% cellulose acetate, preferably about 4% cellulose acetate. These plasticizers are further disclosed in U.S. Pat. No. 3,190,295 (plasticizing esters such as triacetin [glyceryl triacetate] mixed with a dialkyl orthophthalate, e.g., diethyl phthalate, dibutyl phthalate and dioctyl phthalate), U.S. Pat. No. 3,227,164 (plasticizer bonding agents selected from the group consisting of alkylene glycol and polyalkylene glycol esters of acetoacetic acid, e.g., glyceryl triacetoacetate, ethylene glycol, diacetoacetate, propylene glycol diacetoacetate, tetraethylene glycol diacetoacetate, dipropylene glycol diacetoacetate, glycerol triacetoacetate and the like), U.S. Pat. No. 3,393,684 (esterfied improved plasticizer type hardening in phenol removing agents such as the esterified propionic acid esters of tri, tetra and pentaethylene glycol), U.S. Pat. No. 3,229,699 (the use of 5 to 20% by weight of polyethylene glycol diacetate), and U.S. Pat. No. 3,640,742 (disclosing plasticizer blends made from about 40 to about 60% by weight glyceryl triacetate with the remainder being primarily a polyethylene glycol diacetate). All the above patents being incorporated herein by reference. The preferred esters are triethylene glycol diacetate and glyceryl triacetate (triacetin) for cigarette filters, and dimethyl phthalate, 1,3-butanediol diacetate and γ-butyrolactone when these polyesters are used in the preparation of other nonwoven articles. The bondability of these fibers are essential in order to allow the mass of fibers the rigidity needed for use in cigarette filters and other nonwoven articles.

Examples of filters from crimped tows of cellulose acetate fibers are well known in the art and are described in numerous patents. Some of the important properties associated with the processing of these filters are the rapidity at which they may be continuously manufactured from a bale or roll of tow and the ease at which the crimped continuous filters can be coalesced together by means of nontacky essentially nonvolatile organic plasticizers to impart rigidity to the finished filter rods. See U.S. Pat. Nos. 3,003,504 and 3,008,474. The methods for preparing firm cigarette filters from cellulose acetate tow and the bonding plasticizers mentioned above have been satisfactory. However, it has been difficult to prepare bonded filters from fibers other than cellulose acetate. The normal bonding action of high-boiling esters is not effective on commercial synthetic fibers such as polyethylene terephthalate. Many methods exist for bonding fibers into nonwoven articles with the use of bonding agents at the points of fiber contact. Such methods are described in U.S. Pat. Nos. 2,734,841, 2,811,029, 2,978,785, 3,102,835, 3,271,220 and 3,365,354. Other methods of bonding fibers into nonwoven articles are described in U.S. Pat. Nos. 3,271,220, 3,365,354, 2,734,841, 2,811,029, 2,978,785, 3,102,835, 3,573,130 and the like.

The polyesters useful in this invention have a glass transition temperature (Tg) of at least 80° C. and are bondable at room temperature with triethylene glycol diacetate (TEG diacetate), glyceryl triacetate, dimethyl phthalate, 1,3-butanediol diacetate, and γ-butyrolactone as well as mixtures thereof. TEG diacetate and glyceryl triacetate are preferred for cigarette filters. Since the tobacco end of cigarette filters reaches a temperature of about 80° C. on the last puff of a cigarette, a glass transtion temperature of at least 85° C. is preferred to avoid excessive shrinkage of drafted fibers having no crystallinity. Dimethyl phthalate and γ-butyrolactone are less desirable than TEG diacetate and glyceryl triacetate for cigarette filters but may be used in other nonwoven applications. Drafted fibers with Tg's as low as 50° C. may be used in these other nonwoven applications when the use temperature will not exceed the Tg. If the polyester Tg is less than about 85° C., excessive shrinkage of the fibers and cigarette filters as the last puffs are taken can be avoided if the drafted fibers are crystallized by heatsetting. However, the fiber will not bond with the bonding plasticizer. This problem can be avoided by not drafting the fibers. Then fiber shrinkage will not occur and heatsetting will be unnecessary. Drafted fibers are preferred, however, because higher fiber production speeds and lower deniers are attained. Finer denier fibers are desirable because they increase the efficiency of the cigarette filters.

In accordance with the present invention the preferred polyester used to prepare the fibers which in turn are used to prepare the filters of this invention are characterized in the Tg of greater than about 85° C. the glycol component of the polyester is entirely 1,2-propylene glycol, and the inherent viscosity is at least about 0.5. When the fibers are used to form nonwoven webs in accordance with the practice of this invention preferably from 10 to about 30 mole percent of ethylene glycol will be used in conjunction with 90 to about 70 mole percent of 1,2-propylene glycol based on a total mole percent of glycol being 100%. When the fibers of the present invention are utilized for nonwoven applications other than cigarette filter tow the bonding solvent suitable for preparing these webs can be any of a large number of common organic solvents such as ethyl acetate, methyl ethyl ketone, methylene chloride, dimethyl formamide and the like. Preferred solvents, however, are the already mentioned high boiling solvents because they eliminate the need for expensive solvent recovery systems.

The polymers of this invention are prepared from terephthalic acid and varying amounts of 1,2-propanediol and ethylene glycol as previously stated. Additionally, these polymers may be prepared by employing from 0 to 0.5 mole percent of a trifunctional modifier. Typical examples of such modifiers include trimethylol propane, trimethylol ethane, 1,2,3-propanetriol, trimesic acid, trimetllitic acid or trimellitic anhydride. Tetrafunctional (e.g., pentaerythritol) or higher functional modifiers may be used, but the trifunctional types are preferred if one desires to use them. It has been found, however, that under the following conditions it is sufficient that just the glycol, e.g., 1,2-propanediol and ethylene glycol, and the terephthalic acid or its ester forming derivatives, e.g., dimethyl terephthalate, is sufficient to prepare the polyesters of this invention. Conventional polyester catalysts may be used to prepare these polymers. A satisfactory catalyst system is about 130 ppm zinc which may be added as the diacetate, 28 ppm titanium which may be added as a tetraalkoxide, and a small amount of phosphorous which may be added as tri(2-ethylhexyl) phosphate. In order to prepare the high molecular weight, fiber-forming polyesters and copolyesters of terephthalic acid or ester-forming derivatives thereof and 1,2-propanediol which may be modified with up to 40% of ethylene glycol, a process is used which comprises carrying out a conventional ester interchange reaction with 1,2-propanediol, dialkyl esters of the terephthalic acid such as dimethyl terephthalate, and optionally up to about 0.5 mole percent of a hydroxyl or carboxyl containing trifunctional component as described above and then conducting the polycondensation step at from about 230° to about 260° C. The reason for the addition of the trifunctional component is the instability of the secondary hydroxyl group of the 1,2-propanediol. When an appreciable amount (30 to 40 mole percent) of ethylene glycol is also present or the polycondensation temperature is limited to about 230° to 240° C., no trifunctional component is required.

The inherent viscosity of the polymers of this invention is at least 0.35 and preferably at least about 0.5.

Fibers of these 1,2-propylene glycol polymers can be melt spun by conventional means and oriented by drafting. Since these fibers are amorphous, they are not heat set. These fibers may be drawn from two to about five times their original length to give fibers as fine as 0.8 den/fil. For filter materials, however, preferred fiber size range is from about 0.8 den/fil. to about 8 den/fil. These fibers may then be combined into groups of 5,000 to 20,000 fibers to give total deniers in the range of 20,000 to 50,000. These fibers may then be crimped (10 to 30 crimps per inch) and the resulting crimped tows may be used to prepare tobacco smoke filters in a manner well known in the art. Tows may be processed on conventional filter rod makers. A high-boiling plasticizer may be added to the tow in concentrations of 2 to about 10% based on the weight of the tow. The fibers are drawn into a garniture and wrapped with paper. Bonding usually occurs in ten minutes or less at room temperature. The polyester fibers of this invention have several advantages over cellulose acetate fibers for use in cigarette filters. The fibers may be drafted several times their original length, resulting in fine denier (less than 1 den/fil.) fibers. These fine denier fibers are more effective for filtration of smoke aerosol particles than are larger fibers. Some of the amorphous polyester fibers can be bonded into firm rods with very small amounts (4%) of bonding plasticizers. Cellulose acetate fibers require approximately twice as much bonding plasticizers for an equivalent bond. The use of less plasticizer is an economic savings and also less plasticizer will elute into the smoke from the polyester filters of this invention than will elute from the commonly used cellulose acetate filters. Additionally, bonding of many of the polyester fibers of this invention is more rapid than bonding of cellulose acetate fibers.

To prepare nonwoven webs useful in textile applications, the polyester fibers of this invention may be converted to a web from tow or, preferably they may be converted to crimped stable lengths of 1 to 2 inches. The staple fibers are layed into a mat and from 2 to 10% of the bonding eter is sprayed or otherwise applied to the mat. The mat is drawn through rolls or otherwise subjected to pressure to give the necessary contact for bonding. Bonding usually occurs in ten minutes or less, giving a strong nonwoven fabric without the need for a drying step as would be the case when conventional adhesives are used in producing nonwoven fabrics or articles. See for example U.S. Pat. No. 3,689,199.

Additionally, it was found that when the polyester fibers of this invention were treated with small amounts of plasticizers such as little as 3% triacetin, the fibers are bonded instantly into coherent rods when treated with warm air even though the glass transition temperature of the polymers is in the range of from 80° to about 95° C. The formation of unwrapped rods is advantageous for several reasons. The paper wrap may be eliminated ad thus the cost savings can be realized by the rod producer. The filter rods are firm immediately and can be processed and cut more rapidly than conventional filter rods. These nonwrapped rods and rods made by conventional processes may be molded with moderate heat into designs which are very efficient for the filtration of smoke particulate matter. Many of these molded designs are described in U.S. Pat. No. 3,768,489. Additionally, these polyester fibers may be molded at surprisingly low temperatures (60° C., nearly 60° lower than molded compositions for cellulose acetate fiber).

The fibers of this invention may also be utilized to prepare plasticizer bondable nonwoven webs useful as cigarette filter material. This can be accomplished by preparing strong nonwoven webs from mixed staple fibers of an amorphous plasticizer-bondable polyester of this invention and a crystalline polyester such as poly(ethylene terephthalate). The staple fibers may be blended and converted into a loose batting on a textile carding machine, a small amount (less than 10%) of plasticizer such as TEG diacetate or an aqueous plasticizer solution is applied to the batting and the batting is subjected to pressure for 10 min., or is processed through rolls heated to about 60°-80° C. to form a strong nonwoven web. These coherent webs of staple fibers may then be converted to rigid rods on a cigarette filter-making device with the application of heat or some additional plasticizer. The resulting filters have efficiencies for the removal of tar and nicotine from smoke which are equal to those of commercial filters.

In addition to the above filter materials the fibers of this invention may be fabricated into melt-blown webs which are also useful as cigarette filter materials. The webs consist of very fine fibers which are thermally bonded into a strong continuous bond or "pseudo tow". These melt-blown webs are prepared from the polymeric or polyester material of this invention, preferably poly(1,2-propylene terephthalate). These webs are easily bonded to coherent filter rods with the addition of a few percent of a common plasticizer as more fully defined above. The preferred plasticizer for this embodiment of the invention is triacetin. One method by which the filters of this embodiment may be prepared is through a process in which the polyester is extruded in molten form through an orifice of a heated nozzle into a stream of hot gas. The hot gas draws the molten polymer into very fine fibers, and these resulting fibers are collected on a moving apparatus in the form of a nonwoven web. The thermally-bonded webs are then packaged in bales or on rolls for shipment. A single web is withdrawn and processed into filter rods on a commercial plug maker. During the plug making operation, a few percent of plasticizer, from about 2 to 6%, is applied to the web. The plasticizer causes dissolution type bonding and the web is formed into a firm, coherent, round filter rod. Melt-blown processes are known to give very fine fibers. It is also known that fine fibers are more efficient than large fibers for the filtration of smoke particles. Therefore, the high filtration efficiency of filters made from these webs is expected. However, it was surprising to find that the excellent filters could be made with only a fraction of the material weight required by present commercial filters made from crimped tows. For example, a filter made with only 35 mg. of melt-blown web was found to be as efficient as present filters for the removal of smoke particles. This low weight was found to be approximately ¼ the weight of most commercial filters (weight = 140 mg.). It was also found that a small percentage of large fibers could be sandwiched into the web of fine fibers. These large fibers gave enhanced firmness and strength of the web which aids in processing the "pseudo tows" into filters. The additional firmness also is a desirable feature in the resulting filters. Filters should be firm to be properly cut and joined to tobacco columns in cigarette manufacture and the firmness is necessary for consumer acceptance.

Various melt-blowing techniques are described in the literature. These various techniques may be successfully utilized to prepare melt-blown mats of fibers which may be utilized for producing melt-blown nonwoven articles. Examples of these patents are U.S. Pat. Nos. 2,374,540, 2,411,659, 2,411,660, 2,437,263, 2,508,462, 3,615,995 and 3,849,241. Some of these patents indicate the melt-blown webs prepared therefrom are useful as air filters and a few even refer to cigarette filters. However, the unique aspects of the present invention include the very light weight of the filters, which represent a large material savings and the fact that these fibrous webs can be bonded into firm, coherent filter rods with the addition of high boiling organic plasticizers. Moreover, the firmness of the rods can be controlled by regulating the amount of large fibers which are added to the webs.

This invention will be further illustrated by the following examples although it will be understood that these examples are included merely for purposes of illustration and are not intended to limit the scope of the invention.

All inherent viscosities are determined at 25° C. in 60/40 phenol/tetrachloroethane at a concentration of 0.5 g./100 ml.

EXAMPLE 1

A mixture of 97 g. (0.5 mole) dimethyl terephthalate, 114 g. (1.5 moles) 1,2-propanediol, 0.34 g. trimethylolpropane (0.0025 moles, 0.5 mole percent), 0.04 g. zinc acetate (130 ppm Zn), 0.8 ml of titanium tetraisopropoxide catalyst solution (28 ppm Ti) and 0.02 g. of tri(2-ethylhexyl) phosphate is placed in a 500-ml flask equipped with a stirrer, a short distillation head with inlet and outlet for nitrogen. The nitrogen outlet, which is connected to a receiver, has provision for applying vacuum. The mixture is stirred at 180°–190° C. in a nitrogen atmosphere until the ester interchange is completed (3 hr.). A vacuum of 0.5 mm is then applied at 240° C. and stirring is continued for 3.35 hr. A clear, very light yellow polymer is obtained. The polymer has an inherent viscosity of 0.57 and Tg of 96° C. Pressed films (5.0-mil thickness) of this polymer are clear, tough, and creaseable without breaking.

Fibers are melt spun (250° C.) and drafted (3X) by conventional techniques. The fibers have the following properties: tenacity 2.3 g./den., elongation 12%, elastic modulus 68 g./den., and flow point 118° C. The fibers are used to prepare cigarette filter rods which are effectively bonded with triethylene glycol diacetate, a bonding agent used to manufacture cellulose acetate filters.

The polymer is soluble in the following solvents (10 g. polymer/90 g. solvent): methylene chloride, propylene chloride, ethylene chloride, trichloroethylene, and many of the lacquer solvent mixtures used in the trade.

Similar results are obtained when the trimethylolpropane is replaced with 0.5 mole percent of other trifunctional modifiers, such as glycerol, trimesic acid or trimellitic anhydride.

EXAMPLE 2

This example illustrates that a high molecular weight poly(1,2-propylene terephthalate) can be obtained when no trimethylolpropane is used if the reaction is carried out at 240° C.

Example 1 is repeated, except no trimethylolpropane is added to the reaction mixture and a vacuum (0.5 mm Hg) is applied at 240° for 3.75 hr. A clear, very light yellow polymer with inherent viscosity 0.46 is obtained. A film (5-mil) pressed at 240° C. is clear, colorless and flexible. Fibers spun at 240° C. and drafted (3.6X) in water at 68° C. have a tenacity of 2.0 g./den., elongation 36%, and elastic modulus 68 g./den.

EXAMPLE 3

Using the equipment described in Example 1, a copolyester is prepared from a mixture of 97 g. (0.50 mole) dimethyl terephthalate, 30.7 g. (0.50 mole) ethylene glycol, 100 g. (1.32 mole) 1,2-propanediol, 0.04 g. zinc acetate (130 ppm Zn), 1.6 ml of titanium tetraisopropoxide catalyst solution (56 ppm Ti), and 0.02 g. of tri(2-ethylhexyl)phosphate (color stabilizer). The mixture is stirred at 180°–190° C. in a nitrogen atmosphere until the ester interchange is completed (3 hr.). A vacuum of 0.5 mm is then applied at 240° C. for 1.33 hr. and 250° C. for 1 hr. The polymer has an inherent viscosity of 0.62. NMR analysis shows the presence of 43 mole percent ethylene glycol. A pressed 5-mil film of the copolymer is clear, tough and creaseable. Fibers spun at 260° C. and drafted (3.6X) in water at 68° C. have a tenacity of 3.3 g./den., elongation 19%, and elastic modulus 84 g./den.

EXAMPLE 4

A crimped tow composed of poly(1,2-propylene terephthalate) consisting of about 14,000 drafted fibers of 3.0 den./fil. and containing 16 crimps per inch is bloomed out with air and then sprayed with 4% (by weight) triethylene glycol diacetate. The tow is drawn into a cylindrical device having the same inside diameter as a cigarette (7.85 mm) where it is wrapped with conventional "filter rod paper" and then cut into lengths of 100 mm. In about 15 min. these rods are quite rigid because of the curing action of the plasticizer. Filters 20 mm in length are cut from the cured rod and attached to 65-mm cigarette columns. The cigarettes are automatically smoked to 27 mm butt lengths and total particulate matter (TPM) delivery is determined in the manner described by Ogg, JAOAC, 47, 358 (1964). By smoking control cigarettes without filters, the amount of TPM removed by the filters is determined. The efficiency of the filters for removing nicotine is determined by gas chromatography. Results of the tests are shown in Table I.

Table I

| Cigarettes | Press. Drop, Inches | TPM/ Cig., Mg. | Nic./ Cig., Mg. | Percent TPM Removal | Percent Nic. Removal |
|---|---|---|---|---|---|
| No filter | 0 | 34.0 | 2.30 | 0 | 0 |
| Filter | 2.0 | 22.4 | 1.53 | 34 | 33.5 |

EXAMPLE 5

Example 4 is repeated except 4% glyceryl triacetate is applied to the tow as the bonding agent. The fibers bond into coherent, firm rods in 20 min. Similar efficiency is observed.

EXAMPLE 6

A crimped tow composed of about 6,000 poly(1,2-propylene terephthalate) fibers 3.0 den./fil. and about 6,000 poly(ethylene terephthalate) 3.0 den./fil. comingled together is sprayed with 6% (by weight) triethylene glycol diacetate. The tow is converted to paper wrapped filter rods by a filter-making device. In approximately 20 min., a firmly bonded rod is formed.

The filter rods are tested for efficiency in the following manner: A 20-mm segment, having a pressure drop of 2.1 in. of water, is attached to a 65-mm cigarette column. The cigarette is smoked to a 27-mm butt length and total particulate matter (TPM) delivery is determined in the manner described by Ogg, JAOAC, 47, 358 (1964). By smoking control cigarettes without filters, the amount of TPM removed by the filters is determined. The efficiency of the filters for removing nicotine is determined by gas chromatography. Results of the tests are shown in Table II.

Table II

| Cigarettes | Press. Drop, Inches | TPM/ Cig. Mg. | Nic./ Cig. Mg. | Percent TPM Removal | Percent Nic. Removal |
|---|---|---|---|---|---|
| Control (NF) | 0 | 33.0 | 2.25 | 0 | 0 |
| Filter | 2.0 | 21.8 | 1.48 | 34.0 | 34.0 |

EXAMPLE 7

Example 4 is repeated except that 5% of a 1:1 blend of glycerol triacetate and triethylene glycol diacetate is sprayed on the tow as the bonding agent. The tow is converted to filters and bonding occurs in approximately 20 min. Similar efficiency is observed. When dimethyl phthalate and γ-butyralactone are used as bonding agents similar results are observed.

EXAMPLE 8

A tow of undrafted fibers is prepared from a copolyester composed of 100 mole percent terephthalic acid, 28 mole percent ethylene glycol, and 72 mole percent 1,2-propanediol. The tow, consisting of about 13,000 fibers of 3.0 den./fil. containing 14 crimps per inch, is sprayed with 4% triethylene glycol diacetate. The treated tow is converted to paper wrapped filter rods by a filter-making device. Filter tips, 20-mm in length, are cut from the rods and attached to 65-mm cigarette columns. The cigarettes are smoked to 27-mm butt lengths and total particulate matter (TPM) delivery is determined in the manner described by Ogg, JAOAC, 47 358 (1964). By smoking control cigarettes without filters, the amount of TPM removed by the filters is determined. The efficiency of the filters for removing nicotine is determined by gas chromatography. Results of the tests are shown in Table III.

Table III

| Cigarette | Press. Drop, Inches | TPM/ Cig. Mg. | Nic./ Cig., Mg. | Percent TPM Removal | Percent Nic. Removal |
|---|---|---|---|---|---|
| No filter | 0 | 34.0 | 2.35 | 0 | 0 |
| Filter | 2.4 | 21.4 | 1.49 | 37.0 | 36.5 |

EXAMPLE 9

Example 7 is repeated except that 4% glyceryl triacetate is used to bond the tow instead of triethylene glycol diacetate. The filters reach a satisfactory firmness of 20 min. and similar filtration efficiency is observed. When dimethyl phthalate and γ-butyrolactone are used as bonding agents similar results are observed.

EXAMPLE 10

A crimped tow consisting of about 15,000 fibers of 3.0 den./fil. and containing 16 crimps per inch is prepared from bicomponent fibers. The fibers have an inner core of poly(ethylene terephthalate) an an outer shell of poly(1,2-propylene terephthalate). The tow is bloomed (spread apart) and sprayed with 5% (by weight) triethylene glycol diacetate. It is then converted to paper wrapped filter rods by a filter making device. The filter rods are firmly bonded in about 20 min.

EXAMPLE 11

A crimped tow consisting of about 15,000 fibers of 3.0 den./fil. and containing 16 crimps per inch was prepared from a polyester composed of 100 mole percent terephthalic acid, 72 mole percent 1,2-propanediol, and 28 mole percent ethylene glycol. The tow was bloomed (spread apart) and sprayed with 4% (by weight) 1,3-butanediol diacetate. It is then converted to filter rods by a filter-making device. The fibers are firmly bonded in about 15 min.

EXAMPLE 12

A crimped tow consisting of about 14,000 fibers of 3.0 den./fil. and containing 20 crimps per inch is made from a polyester composed of 100 ml percent terephthalic acid, 30 mole percent ethylene glycol, and 70 mole percent 1,2-propanediol. The fibers comprising the tow are stretched (or drawn) 3.5 times their original length after spinning. To prevent shrinkage of the tow when exposed to heat above about 95° C., which is the glass transition temperature of the fibers, the tow is preshrunk at a temperature of 80° C. for 10 min. The tow shrinks to approximately 80% of its original length. When used as a cigarette filter, no additional shrinkage occurs during the final puffs of smoke.

EXAMPLE 13

A crimped tow of about 12,000 filaments of 3.0 den./fil. spun from poly(ethylene terephthalate) is bloomed and sprayed with 4% triethylene glycol diacetate. The treated tow is positioned over a bloomed tow of about 12,000 filaments, 3 den./fil., of poly(1,2-propylene terephthalate). The two tows are pressed together. A bond is formed between fibers as the bonding solvent partially dissolves the poly(propylene terephthalate), causing the connecting fibers to adhere together at contact points. The excess bonding agent diffuses into the fibers leaving a dry nontacky surface. The nonwoven fabric is useful for clothing insulation, blanket batting and other uses where an insulation material is required.

EXAMPLE 14

Example 12 is repeated except that two layers of bloomed poly(ethylene terephthalate) tow (12,000 filaments, 3.0 den./fil.) are sprayed with 4% triethylene glycol diacetate and placed on each side of a bloomed poly(1,2-propylene terephthalate) tow (12,000 filaments, 3.0 den./fil.) forming a three-layer sandwich-type nonwoven fabric. The bonded fabric is useful in many clothing, bed coverings, and other applications.

EXAMPLE 15

Two sections of bloomed crimped tow of poly(ethylene terephthalate) of about 12,000 filaments (3.0 den./fil.) was sprayed with 4% triethylene glycol diacetate. A section of tow of about 12,000 filaments (3.0 den./fil.) made from a copolymer of 100 mole percent terephthalic acid, 28 mole percent ethylene glycol and 72 mole percent propylene glycol was sandwiched between the two treated sections of poly(ethylene terephthalate) tow and pressed firmly together. After 5 min., a nonwoven fabric was formed by action of the bonding solvent on the copolymer causing its filaments to fuse with the other fibers at random points of contact.

EXAMPLE 16

Example 12 is repeated except that a staple of 2-in. fibers of 3 den./fil. containing 50% poly(ethylene terephthalate) and 50% poly(propylene terephthalate) is spread out to form a batting 16 in. long and 12 in. wide. The batting is sprayed with 4% triethylene glycol diacetate and pressed firmly together for 10 min. between two flat metal plates. When the plates are removed, the batting is bonded into a nonwoven fabric.

EXAMPLE 17

Example 15 is repeated except that the staple is composed of 50% of a staple fiber of poly(1,4-cyclohexylenedimethylene terephthalate) and a copolymer staple spun from 100 mole percent terephthalic acid, 28 mole percent ethylene glycol and 72 mole percent 1,2-propanediol. The blend is sprayed with 6% of a bonding blend of 50% triethylene glycol diacetate and 50% glyceryl triacetate. When the batting is pressed firmly together for 10 min., a bonded nonwoven fabric is formed.

EXAMPLE 18

Example 12 is repeated except that dimethyl phthalate is used as the bonding agent.

EXAMPLE 19

Example 12 is repeated except that 6% glyceryl triacetate is used to bond the fibers together.

EXAMPLE 20

A tow was prepared from a polyester of terephthalic acid (100 mole percent), 1,2-propanediol (72 mole percent) and ethylene glycol (28 mole percent) I.V. 0.5. The tow containing approximately 12,800 filaments of 3.6 D/F was bloomed (spread apart) and sprayed with 4% (by weight) triacetin. The treated tow was then drawn through a tubular apparatus (approximately 150 mm in length and 8 mm in diameter) into which 85° C. air was flowing at the rate of about 0.80 cubic feet per minute. Residence time in the tube was about one second. The compacted tow emerged from the apparatus as a bonded rod.

Sections of the rod, 20 mm in length, were attached to 64 mm cigarette columns and tested by standard methods used to test cigarette filters for efficiency in removing total particulate matter and nicotine from the smoke. The filters were comparable to commercial cellulose acetate filters of similar fiber size and pressure drop in efficiency for removal of these smoke components. The data are shown below:

| Filter | % Plasticizer | Press. Drop,[1] Inches Water | % Total Particulate Matter Removed | % Nicotine Removed |
|---|---|---|---|---|
| Polyester | 3.1 | 3.0 | 47.5 | 47.5 |
| Polyester | 6.0 | 1.4 | 34.0 | 35.0 |
| Cellulose Acetate | 8.0 | 3.0 | 47.0 | 44.0 |
| Cellulose Acetate | 8.0 | 1.8 | 36.0 | 34.0 |

[1]Measured at an air flow of 17.5 ml/sec.

The above experiment was repeated except that cellulose acetate tow was substituted for the polyester tow. The cellulose acetate tow was sprayed with 8% triacetin and drawn through the air curing tube (95° air). The cellulose acetate was not bonded into a rod as was the polyester.

EXAMPLE 21

These examples were done according to Example 19, using the same tow, but with the curing temperature and amount of bonding plasticizer varied. The results are shown in Table IV.

Table IV

| | Copolyester Tow[1] Bonded With Triacetin and Hot Air | | |
|---|---|---|---|
| Example | % Triacetin | Curing Air Temperature, ° C. | Bonded or Not Bonded |
| a | 0 | 85 | Unbonded |
| b | 2 | 85 | Slightly Bonded |
| c | 8 | 85 | Bonded |
| d | 3 | 75 | Bonded |
| e | 8 | 75 | Bonded |
| f | 4 | 60 | Bonded |
| g | 8 | 50 | Slightly Bonded |

Table IV-continued

| | Copolyester Tow[1] Bonded With Triacetin and Hot Air | | |
|---|---|---|---|
| Example | % Triacetin | Curing Air Temperature, ° C. | Bonded or Not Bonded |
| | | | Bonded |

[1]Copolyester tow (3.6 D/F, 45,000 total denier, round cross-section) composed of 100 mole percent terephthlic acid, 28 mole percent ethylene glycol and 72 mole percent 1,2-propanediol.

EXAMPLE 22

The procedure in Example 19 was repeated except that a polyester tow made from 100 mole percent terephthalic acid and 100 mole percent 1,2-propanediol was used. The tow contained 12,000 filaments of 3.3 D/F. The amount of bonding plasticizer and temperature of the curing air was varied. The results are shown in Table V.

Table V

| | Polyester Tow[1] Bonded With Triacetin and Hot Air | | |
|---|---|---|---|
| Example Number | % Triacetin | Curing Air Temperature, ° C. | Bonded or Unbonded |
| a | 0 | 85 | Unbonded |
| b | 2 | 85 | Slightly Bonded |
| c | 8 | 85 | Bonded |
| d | 3 | 75 | Bonded |
| e | 8 | 75 | Bonded |
| f | 3 | 60 | Bonded |
| g | 8 | 60 | Bonded |
| h | 8 | 50 | Slightly Bonded |

[1]Polyester tow (3.3 D/F, 40,000 total denier, round cross-section) composed of 100 mole percent terephthalic acid and 100 mole percent 1,2-propanediol.

EXAMPLE 23

Example 19 was repeated except that 4% of triethylene glycol diacetate was applied as the bonding agent instead of triacetin. A firm rod was formed as the compacted tow was drawn through the curing tube injected with 85° C. air.

EXAMPLE 24

Example 19 was repeated except that after application of 4% triacetin, the tow was drawn through the curing tube into which steam was injected (approximately 0.29 cubic feed/minute). The compacted tow instantly bonded into a firm rod. Extreme care was taken to keep the actual fiber temperature under 90° C. This was done by regulating the steam flow rate with respect to the linear tow speed. When the fiber temperature was allowed to reach 95° C. the drafted copolyester fibers shrank considerably. This phenomenon is in direct contrast to the behavior of cellulose acetate fibers.

EXAMPLE 25

Example 19 was repeated and firmly bonded filter rods were obtained. The rods were cut to 100 mm lengths and immediately placed in a metal mold (85° C.) which was designed to produce a molded slanted groove radial flow filter. The polyester rod was molded into a firm structure having the shape of the mold.

The above experiment was repeated except that a cellulose acetate rod bonded with 8% triacetin was placed in a slanted groove filter mold at 85° C. The cellulose acetate did not mold at this temperature.

EXAMPLE 26

A tow was prepared from a polyester of terephthalic acid (100 mole percent), 1,2-propanediol (72 mole percent), and ethylene glycol (28 mole percent). The tow containing about 12,800 filaments of 3.6 D/F was converted to paper wrapped rods at room temperature on a conventional commercial filter rod maker. Four weeks after the filter rods were made, the paper was removed. The rods were placed in a mold designed to produce a molded slanted groove filter. The mold was heated to 60° C. The filter was molded to the desired configuration in less than one second.

Examples Relating To The Preparation Of Filter Materials From Melt-Blown Webs Of Poly(1,2-Propylene Terephthalate)

EXAMPLE 27

Poly(1,2-propylene terephthalate) of 0.43 I.V. prepared as in Example 1 was dried overnight in a vacuum oven at 85° to 90° C. The dried polymer was melt extruded at 265° C. in a ½-inch diameter screw extruder at a rate of 0.33 g./minute through a melt-blown spinneret. The spinneret was constructed as shown in U.S. Pat. No. 3,849,241 incorporated herein by reference. Major components in the spinneret are a nozzle which provides a passage for the melt and a housing which forms a pressure equalization chamber for compressed air, e.g., 60 psig flowed into the chamber. Air was heated externally to 300° C. and fed to the spinneret at a rate of 2 SCFM. For minimizing heat loss the spinneret was heated electrically and was maintained at 266° C. As the air left the spinneret assembly, it attenuated the melt into fine fibers and deposited them onto a 16-cm diameter screen drum rotating at a surface speed of 283 feet per minute and at the same time reciprocating with a six-inch stroke along its shaft at 41 cycles per minute. The distance from the spinneret to the point of impingement on drum was four inches. The fibers were collected for 15 minutes and the resulting web measuring approximately 12 cm wide was removed by cutting across the width of the web. Length of the web was 50 cm.

The web weighed 0.0084 g./cm$^2$ and had a breaking strength, $\sigma_L$, 0.5, in the length direction of 112,000 g./cm$^2$ when determined on an Instron tester using ½-inch gauge length extended at 100% per minute. Width of the test piece was one inch. Breaking elongation was 26.4%. Also measured was tensile strength in the length direction with a twoinch gauge length, $\sigma_{L,2}$, and the strength in the width direction using ½-inch gauge length $\sigma_{W,0.5}$. Stress ratios, $\sigma_{L,0.5}/\sigma_{L,2}$ and $\sigma_{L,0.5}/\sigma_{W,0.5}$ were 2.3 and 44.8, respectively. Average fiber diameter was 5µ.

The web, sprayed with approximately 4% triacetin, was formed into a firm cigarette filter of 20 mm long containing 47 mg of the web. Smoking test gave 2.5–2.7 in. water pressure drop and 49.4% removal of total particular matter (TPM). To obtain these levels of pressure drop and TPM removal with a conventional cellulose acetate tow would normally require about 120 mg of the tow.

EXAMPLE 28

A poly(1,2-propylene terephthalate) web was made using the procedure as described in Example 1 except with the following variation. Instead of a fixed extrusion rate, the web was collected by extruding the polymer for one minute at 0.4 g./minute, three minutes at 0.25 g./minute, one minute at 0.4 g./minute, three minutes at 0.25 g./minute, and one minute at 0.4 g./minute in succession. Another variation was the rotation speed of the takeup drum which was 507 feet per minute. The resultant web had the following properties.

Weight of web = 0.0128 g./cm$^2$
Breaking strength, $\sigma_{L,0.5}$ = 17,000 g./cm$^2$
Breaking elongation = 12%
Stress ratio: $\sigma_{L,0.5}/\sigma_{L,2}$ = 1.3
$\sigma_{L,0.5}/\sigma_{W,0.5}$ = 4.2
Fiber diameter = 2–6µ
Filter performance (20 mm tip)
Pressure drop = 2.5–2.8 in. water
Weight = 36 mg.
TPM removal = 42%

A photomicrograph of the web revealed the fibers to be deposited randomly and bonded at numerous fiber crossover points.

EXAMPLE 29

A poly(propylene terephthalate) web was made at an extrusion rate of 0.5 g./minute. Other considerations were the same as those described in Example 1. The following properties were found for the web.

Weight of web = 0.0085 g./cm$^2$
Breaking strength, $\sigma_{L,0.5}$ = 79.00 g./cm$^2$
Breaking elongation = 24%
Stress Ratio: $\sigma_{L,0.5}/\sigma_{L,2}$ = 1.5
$\sigma_{L,0.5}/\sigma_{W,0.5}$ = 17.7
Fiber diameter = 10–15µ
Fiber performance (20 mm tip)
Pressure drop = 2.5 in. water
Weight = 64.4 mg
TPM removal = 48%

A photomicrograph of the web showed no evidence of self-bonding; yet, the weight advantage remained.

Use of Poly(1,2-Propylene Terephthalate) And Modified Poly(1,2-Propylene Terephthalate) As A Coating Composition

EXAMPLE 30

(a) A solution of 20% polyester composed of 100 mole percent terephthalic acid, 72 mole percent 1,2-propanediol and 28 mole percent ethylene glycol having an I.V. of 0.52 (prepared as in Example 1, was prepared in methylene chloride forming a lacquer. The lacquer was painted on a wooden surface. The solvent evaporated at room temperature leaving a hard glossy protective coating on the wood.

(b) A lacquer was prepared by dissolving 30 g. of a polyester composed of 100 mole percent terephthalic acid and 100 mole percent 1,2-propanediol having an I.V. of 0.32 in 100 ml in ethyl acetate. A wooden table top is painted with the lacquer. After the solvent evaporates at room temperature the table is coated with a hard glossy finish. The finish is impervious to water and many common household solvents.

(c) Using the polyester described in (a), a lacquer was prepared by dissolving 20 g. of the polyester in a solvent blend compound of 50% toluene, 20% ethyl alcohol, 15% ethyl acetate, and 15% methyl ethyl ketone. A wooden chair is painted with the lacquer. After drying, the chair surfaces are covered with a hard glossy film which is resistant to scratches and moisture.

(d) A copper wire was dipped in a solution of ethyl acetate containing 20% of a polyester described in (a). The solvent evaporated leaving a clear tough insulating film on the wire. The insulated wire is useful for electrical applications.

(e) Twenty grams of a polymer described in (a) was added to 80 g. of ethyl acetate. Five grams of dimethoxyethyl phthalate plasticizer was added to the mixture. The formulation was coated onto a 8½" × 10" piece of paper. The solvent was allowed to evaporate at room temperature. The paper was left with a tough, clear, flexible coating which adhered firmly to the paper. The coating could not be removed from the paper by mechanical impact.

(f) (d) Was repeated and in addition to the plasticizer, 5 g. of finely divided carbon black was added to the formulation. The carbon black was uniformly dispersed in the liquid by exposing the mixture to ultrasonic radiation in an ultrasonic bath for 10 min. The formulation was then painted onto a paper surface by brushing and by means of small printing roller. The ink formulation dried quickly at room temperature. The ink adhered firmly to the paper and could not be removed or smeared with vigorous wiping.

(g) Twenty grams of polymer described in (a) was added to 80 g. of dimethylformamide. The solution was coated onto a 8" × 10" piece of cotton fabric. The solvent was allowed to evaporate in an oven set at 50° C. The fabric was coated with a tough flexible coating which adhered firmly.

EXAMPLE 31

A staple consisting of 50 weight percent of a 1.5 denier poly(ethylene terephthalate) fiber and 50 weight percent of 3.6 denier fiber of poly(propylene terephthalate) was blended on a commercial textile carding machine. A roving was formed from the blended fibers. The roving was spread to form a 6-inch web. The web was sprayed with 2% triethylene glycol diacetate and pressed flat to cause fiber to fiber contact. After 10 minutes, the web was bonded into a coherent continuous structure. The web was drawn through small filter making device approximately eight millimeters in diameter. Heated air (85° C.) was introduced into the device and the compacted web instantly bonded into a round coherent rod. The rod, cut into 20 to 21-millimeter lengths, was useful as cigarette filters.

EXAMPLE 32

A staple consisting of a blend of 75% of 3.6 denier poly(propylene terephthalate) and 25% of 1.5 denier poly(ethylene terephthalate) was formed into a batting by a carding machine. A section of the batting was sprayed with 3% glyceryl triacetate and passed between two metal rolls heated to 85° C. The material emerged as a strong nonwoven web. The bonded web was sprayed with 2% glyceryl triacetate and then drawn into a filter-making device. After about 10 minutes, the fibrous web was bonded into a round, firm rod. The rod was cut into 21-millimeter segments and attached to 64-millimeter tobacco columns. Standard smoking tests indicated that the filters were as efficient in removing tar and nicotine from cigarette smoke as were commercial filters of equal denier and pressure drop.

EXAMPLE 33

Example 31 was repeated except the fiber consisted of 100% of 3.6 denier poly(propylene terephthalate). The resulting filter rods were equal in efficiency to rods made from 3.6 denier cellulose acetate fibers.

EXAMPLE 34

Example 31 was repeated except the bonding agent employed was an aqueous solution containing 25% triethylene glycol diacetate. Approximately 4% of the solution was sprayed on the web and the web was processed through metal rolls heated to 85° C. The resulting web was drawn into a filter-making device and again a firm rod was obtained in approximately 10 minutes. Segments of the rod were tested for the removal of tar and nicotine from cigarette smoke. The filters were as efficient as commercial cellulose acetate filters of the equivalent denier and pressure drop.

EXAMPLE 35

Example 31 was repeated except that the bonding agent was an aqueous solution containing 50% triethylene glycol diacetate. Three percent of the solution was applied to the web. After the coherent web was formed with heat, the web was allowed to cure at room temperature for one hour. After this, it was folded and placed in a package and several pounds of weight were added to the top of the package. The web was stored in this package for 24 hours. The package was opened and the web was easily withdrawn from the package. It was processed into filter rods as described in Example 31.

EXAMPLE 36

(a) A film of about 5 mils thickness was extruded from a copolyester prepared from 100 mole percent terephthalic acid, 72 mole percent 1,2-propanediol and 28 mole percent ethylene glycol. The film was cut into strips of 1 in. wide by 5 in. long. A drop of methylene chloride was placed on the end of a strip and a second strip was placed over the solvent drop. The two strips overlapped end to end by 1 in. In 60 sec., the film strips were firmly bonded together. The bonded strips were stress-tested for shear strength by an Instron TTCM. The film itself broke at 27.4 lb. of applied stress, but the bond did not fail.

(b) Example (a) was repeated with similar film strips, except that a few drops of ethyl acetate were used as the bonding solvent. The bonded film strip was stress-tested with the Instron TTCM. The film broke at 17.72 lb. of applied stress, but the bond held firm.

(c) Example (a) was repeated with similar film strips except that a few drops of methyl acetate were used as the bonding solvent. The bonded film strip was stress-tested with the Instron TTCM. The bond failed at 15.0 lb. of applied stress.

(d) Example (a) was repeated with similar film strips except that a few drops of acetone were used as the bonding solvent. The bonded film strip was stress-tested with the Instron TTCM. The film broke before the bond fails.

Solution of the polymer in the various solvents can be used if desired. The bond strengths are approximately the same as those prepared with a solvent alone.

The invention has been described in detail with particular reference to preferred embodiments thereof, but it will be understood that variations and modifications can be effected within the spirit and scope of the invention.

We claim:

1. A fiber of a polyester of terephthalic acid or an ester forming derivative thereof and a glycol of from about 60 mole percent to 100 mole percent 1,2-propylene glycol and from 0 to about 40 mole percent ethylene glycol; said polyester having an inherent viscosity of at least about 0.35 in a 60/40 parts by weight solution of phenol/tetrachloroethane at 25° C. at a concentration of 0.5 gram of polyester in 100 ml. of said solvent, and a Tg of at least 80° C.

2. The fiber of claim 1 wherein the inherent viscosity is at least about 0.5 and the Tg is at least about 85° C.

3. The fiber of claim 1 wherein the ethylene glycol content of the polyester is from 10 to about 30 mole percent, and the inherent viscosity is at least about 0.5.

4. A continuous melt blown web of the fiber of claim 1.

5. A continuous melt blown web of the fiber of claim 2.